May 14, 1929.  A. C. INSKEEP  1,713,282
MUSIC INSTRUCTION DEVICE
Filed Jan. 27, 1928
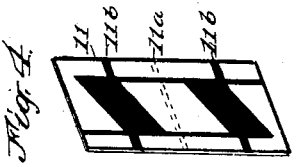
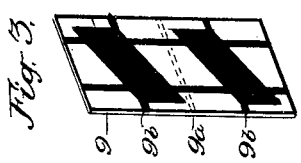
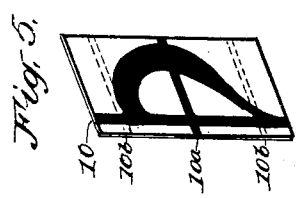
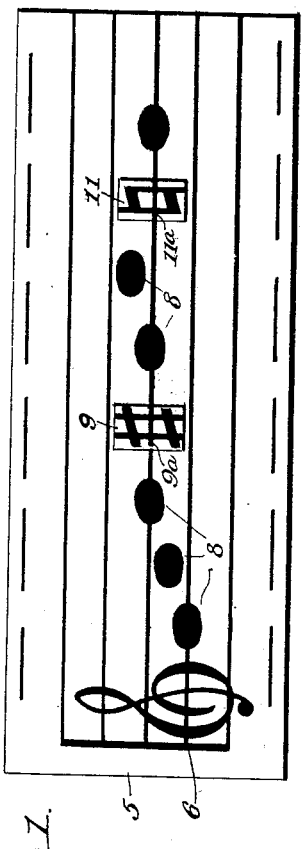
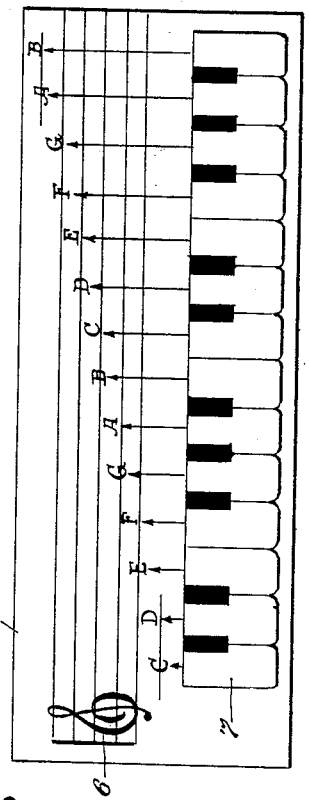

Patented May 14, 1929.

1,713,282

UNITED STATES PATENT OFFICE.

ALICE C. INSKEEP, OF CEDAR RAPIDS, IOWA.

MUSIC-INSTRUCTION DEVICE.

Application filed January 27, 1928. Serial No. 249,852.

This invention relates to elementary instruction in music, with more especial relation to such instruction in public schools, and has for its object to provide the pupil with means whereby he may manually display a suggested musical score, or the elements of such a score, while seated at his desk.

The invention embodies certain improvements in apparatus for this purpose, having in view accuracy in the placing of characters on the staff; economy in the use of such characters, and a graphic representation of the letters of the scale in relation to the keyboard of a piano.

In the accompanying drawing, forming a part of this specification, Fig. 1 shows a typical musical chart with certain musical characters disposed on the staff. Fig. 2 shows the reverse side of the same. Fig. 3 shows one side of a sharp character. Fig. 4 shows the same side of a "natural". Fig. 5 shows the opposite side of a flat, and Fig. 6 the same side of a note.

A good sized sheet of stout cardboard 5 (in practice about 7 x 17 inches) has prominently printed on one face a part of a musical staff 6 (preferably the G cleff staff), with broken lines above and below to denote "added lines". On the opposite side of the sheet is printed a similar, but smaller staff, and below it a group of piano keys 7, preferably including two octaves. Above the keys the letters of the scale are disposed in their proper musical order, and from the keys upwardly extending arrow lines lead to the respective letters. The class work may be on the face of the chart, above mentioned, and to be more fully set forth hereafter. It may be desired to impress upon the minds of the class the elementary arrangement of notes by their letter symbols on the staff, or the relation of such arrangement to the piano keyboard, or the location of half-steps in the scale, or the location of the black keys in the keyboard, and the reason therefor. The pupils have only to turn their charts over, and all of this elementary matter is at once visibly evident to the dullest or most forgetful pupil, and without a moment's waste of time.

Referring now to Fig. 1, which may be said to represent the face of the chart, as distinguished from the back in Fig. 2, the manner of its use may be explained as follows:

A group of cards is provided for each chart. The group includes a considerable number of notes 8, which for all practical purposes may be limited to black-faced disks. These may be printed on a rectangular card, as shown in Fig. 6, but are preferably stamped out of cardboard black-faced on both sides, and in the elliptical form shown in Fig. 1, for the greatest convenience of the pupil. The other cards of the group include sharps 9, flats 10 and naturals 11. These are also reversible, and on one side are provided with centrally disposed cross-lines, $9^a$, $10^a$ and $11^a$, respectively, to match a single line of the staff 6, to modify the tone of the succeeding note or notes on that line. On the opposite side each character is provided with double marginal lines, $9^b$, $11^b$, for example, registering with two lines of the staff, to modify the tone of the succeeding note or notes in the space between the lines. These index lines enable the pupil to set the chromatic characters with precision on the staff, and thus familiarize him with the precise nature of written music, while training him to correlate the sounds of a musical phrase as sung or played with his manual reproduction of the phrase on his chart.

The importance of these marginal position lines applies more directly to the chromatic signs than to the notes, since a partial displacement of such a character would be quite confusing, while more latitude might be allowed in the case of a note. By printing the characters on one side for lines of the staff and on the other side for spaces the pupil may place the right one on his chart with the least possible loss of time, and his desk is not cumbered with a multiplicity of differing character cards.

Having thus described my invention, I claim:

A device for musical instruction, embracing a chart displaying a musical staff, a group of notes adapted for placement on the lines and interspaces of the staff, and reversible chromatic character cards applicable to such lines and spaces, one side of each card being centrally cross-lined to register the character on the staff-line, and the opposite side being doubly cross-lined to register the character with the space between staff-lines.

In testimony whereof I affix my signature.

ALICE C. INSKEEP.